(12) United States Patent
Paulitsch et al.

(10) Patent No.: US 7,596,153 B2
(45) Date of Patent: Sep. 29, 2009

(54) CLOCK-STATE CORRECTION AND/OR CLOCK-RATE CORRECTION USING RELATIVE DRIFT-RATE MEASUREMENTS

(75) Inventors: Michael Paulitsch, Columbia Heights, MN (US); Brendan Hall, Eden Prairie, MN (US); Kevin R. Driscoll, Maple Grove, MN (US)

(73) Assignee: Honeywell International Inc., Morristown, NJ (US)

(*) Notice: Subject to any disclaimer, the term of this patent is extended or adjusted under 35 U.S.C. 154(b) by 432 days.

(21) Appl. No.: 11/549,457

(22) Filed: Oct. 13, 2006

(65) Prior Publication Data

US 2008/0089363 A1 Apr. 17, 2008

(51) Int. Cl.
*H04L 3/06* (2006.01)
(52) U.S. Cl. .................................. 370/503; 370/345
(58) Field of Classification Search .............. 370/252, 370/503, 324, 505, 350, 343, 230, 485; 375/346
See application file for complete search history.

(56) References Cited

U.S. PATENT DOCUMENTS

| | | | | |
|---|---|---|---|---|
| 4,224,473 | A * | 9/1980 | Kaul et al. ............... | 370/505 |
| 4,346,470 | A * | 8/1982 | Alvarez et al. ........... | 370/324 |
| 6,243,372 | B1 * | 6/2001 | Petch et al. .............. | 370/350 |
| 6,307,868 | B1 * | 10/2001 | Rakib et al. .............. | 370/485 |
| 6,798,790 | B1 * | 9/2004 | Enssle et al. ............. | 370/503 |
| 6,975,652 | B1 * | 12/2005 | Mannette et al. ......... | 370/503 |
| 7,039,134 | B1 * | 5/2006 | Avital et al. .............. | 375/343 |
| 2002/0061012 | A1 * | 5/2002 | Thi et al. ................. | 370/352 |
| 2003/0016770 | A1 * | 1/2003 | Trans et al. .............. | 375/346 |
| 2005/0129038 | A1 | 6/2005 | Hall et al. | |
| 2005/0135277 | A1 | 6/2005 | Hall et al. | |
| 2005/0135278 | A1 | 6/2005 | Hall et al. | |
| 2005/0152377 | A1 | 7/2005 | Hall et al. | |
| 2005/0152379 | A1 | 7/2005 | Hall et al. | |
| 2005/0198280 | A1 | 9/2005 | Hall et al. | |
| 2007/0008884 | A1 * | 1/2007 | Tang ....................... | 370/230 |
| 2008/0089363 | A1 * | 4/2008 | Paulitsch et al. ......... | 370/503 |

FOREIGN PATENT DOCUMENTS

WO 03010611 2/2003

OTHER PUBLICATIONS

Babaoglu et al., "(Almost) No Cost Clock Synchronization", Jul. 1987, Publisher: 17th FTCS, Published in: Ithaca NY.

(Continued)

*Primary Examiner*—Thong H Vu
(74) *Attorney, Agent, or Firm*—Fogg & Powers LLC

(57) ABSTRACT

In one embodiment, a method is performed at a node. The method comprises outputting, from a rate-changeable clock included at the node, a first clock signal having a clock rate. The method further comprises generating a second clock signal from the first clock signal for use in determining when transmissions in a network are to start. The method further comprises sending and receiving data from the node using the first clock signal as a line encoding/decoding clock. The method further comprises making relative clock-rate measurements at the node based on transmissions received at the node and using the relative clock-rate measurements to adjust the clock rate of the rate-changeable clock. The method further comprises making clock-state adjustments to the second clock signal.

20 Claims, 5 Drawing Sheets

OTHER PUBLICATIONS

Fetzer and Cristian, "Integrating External and Internal Clock Synchronization", "Real-Time Systems", 1997, pp. 123-171, vol. 12, No. 2, Published in: La Jolla CA.

Kopetz, Herman, "Chapter 3: Global Time", "Design Principles for Distributed Embedded Applications", 1997, pp. 45-70, Publisher: Kluwer Academic Publishers, Published in: Boston, MA.

Kopetz, Hermann and Wilhelm Ochsenreiter, "Clock Synchronization in Distributed Real-Time Systems", "IEEE Transactions on Computer", Aug. 8, 1987, vol. C-36, No. 8, Publisher: IEEE, Published in: Vienna Austria.

Lundelius et al, "A New Fault-Tolerant Algorithm for Clock Synchronization", "Principles of Distributed Computing", Jun. 1984, pp. 75-88, vol. 3, Publisher: ACM, Published in: Cambridge, MA.

Paulitsch, Michael, "Fault-Tolerant Clock Synchronization for Embedded Distributed Multi-Cluster Systems", Sep. 2002, Publisher: Vienna University of Technology, Published in: Portschach Austria.

Schossmaier, Klaus and Bettina Weiss, "An Algorithm for Fault-Tolerant Clock State & Rate Synchronization", "Proceedings of the 18th IEEE Symposium on Reliable Distributed Systems", Oct. 1999, Publisher: IEEE, Published in: Vienna Austria.

"Time-Triggered Protocol TTP/C. High-Level Specification Document.", "Document No. D-032-S-10-028", Jul. 2002, pp. 1-131, Publisher: Tttech Computertechnik GmbH.

Kopetz et al., "Clock-State and Clock-Rate Correction in Fault-Tolerant Distributed Systems", "Real-Time Systems Group", 2006, Publisher: Vienna University of Technology, Published in: Vienna Austria.

* cited by examiner

CLOCK-STATE CORRECTION AND/OR CLOCK-RATE CORRECTION USING RELATIVE DRIFT-RATE MEASUREMENTS

BACKGROUND

In a time-triggered system, a group of nodes synchronize their access to common resources and/or coordinate distributed activities based on time. Each node includes a clock (typically implemented using an oscillator such as a quartz-based oscillator) that is used for such synchronization. For example, in one type of time-triggered system, the clock in each of the nodes of the system is used to synchronize that node's access to a common communication medium.

Typically, a given set of clocks (also referred to here as an "ensemble") are synchronized to one another to build a synchronized global time base by adjusting the state and/or rate of each clock in the ensemble. A commonly used parameter to quantify the quality of clock synchronization is the precision, which defines the maximum difference between the states of each pair of clocks in the ensemble. The precision depends on several parameters, such as the synchronization interval and the maximum clock drift. While the synchronization interval is often determined by environmental and communication systems parameters, the drift rate of clocks (also referred to as "clock skew") depends on several parameters, such as environmental effects (for example, gravity forces or temperature), manufacturing tolerances, and aging effects. As a consequence of these cumulative effects, clocks have two different, main types of drift rates. One that remains relatively constant in the short-term is referred to here as the "systematic part" of the clock drift and the other is referred to here as the "stochastic part" of the clock drift.

Typically, clock synchronization in such systems has addressed achieving fault-tolerant agreement of the states of the clocks in an ensemble during operation and correcting the systematic part of the clock drift of the clocks in an ensemble (for example, before deploying such a system and/or during operation). Such synchronization of clock state and correcting for the systematic part of the clock drift typically involve measuring the difference between the states of two clocks in a time-triggered system or measuring the difference between the actual and expected arrival times of a message in a periodic broadcast system. This is referred to as "time-difference measurement" and the measured values are referred to as "time-difference measurement values."

In some approaches to clock synchronization, clock rate correction for the purposes of establishing a global time base is made, while the system is deployed, by making the same type of adjustment that is used to adjust clock state (typically, by making a virtual-clock offset adjustment). For example, time-difference measurements are made for two frames of data that are received at a given node while no other clock corrections are made (other than adjustments made for the purposes of clock-rate correction based on measurements made during previous periods). The two time-difference measurements are then used to calculate the clock drift. As noted above, this calculated clock drift value is used to emulate clock rate correction for purposes of establishing a global time base by making a virtual-clock offset adjustment. Also, in such an approach, the actual clock rate of the hardware clock that is used by each node's transceiver is not changed (that is, the hardware clock rate is fixed). As a consequence of these two points, any virtual-clock offset adjustments that are to be made for clock-state correction purposes cannot be applied during the period when the multiple time-difference measurements are being made for purposes of calculating a clock-rate adjustment. This period is also referred to as a "blockout period" and is a period when clock-rate and clock-state adjustments cannot be simultaneously made. One example of such a scheme is described in WO 03/010611.

SUMMARY

In one embodiment, a method is performed at a node. The method comprises outputting, from a rate-changeable clock included at the node, a first clock signal having a clock rate. The method further comprises generating a second clock signal from the first clock signal for use in determining when transmissions in a network are to start. The method further comprises sending and receiving data from the node using the first clock signal as a line encoding/decoding clock. The method further comprises making relative clock-rate measurements at the node based on transmissions received at the node and using the relative clock-rate measurements to adjust the clock rate of the rate-changeable clock. The method further comprises making clock-state adjustments to the second clock signal.

In another embodiment, a node comprises a rate-changeable clock that outputs a first clock signal at a clock rate and a transceiver to send and receive data. The transceiver uses the first clock signal as its line encoding/decoding clock for sending and receiving data. The node generates a second clock signal from the first clock signal for use in determining when transmissions in a network are to start. The node makes relative clock-rate measurements and uses the relative clock-rate measurements to adjust the clock rate of the rate-changeable clock. The node makes clock-state adjustments to the second clock signal.

In another embodiment, a node comprises a rate-changeable clock that outputs a first clock signal at a clock rate, a transceiver to send and receive data, and an elasticity buffer. The transceiver uses the first clock signal as its line encoding/decoding clock for sending and receiving data. The node makes relative clock-rate measurements using the elasticity buffer and uses the relative clock-rate measurements to adjust the clock rate of the rate-changeable clock.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
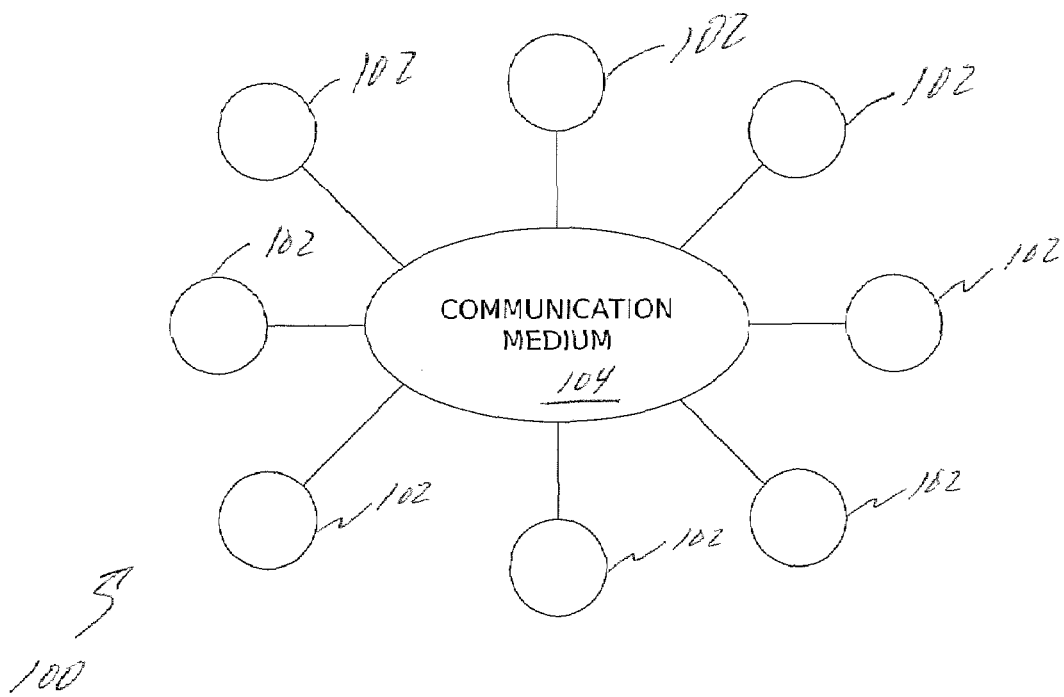
FIG. 1 is a high-level block diagram of an embodiment of a network.

The systems, networks, devices, methods, and techniques described here can be implemented in various types of systems that implement various types of protocols that make use of synchronized clocks (for example, a time-division multiple access (TDMA) protocol such as a time-triggered protocol like TTP/C, SAFEBUS, or FLEXRAY). FIG. 1 is a high-level block diagram of one such network 100. The network 100 comprises a plurality of nodes 102. The nodes 102 communicate with one another over one or more communication media 104 (only one of which is shown in FIG. 1 for illustration purposes). In various implementations of such an embodiment, the communication media 104 comprises wired communication media (for example, copper-wire based media and/or fiber-optic media) and/or wireless communication media (for example, radio frequency (RF) or infra-red (IR) communication links). In various implementations of such an embodiment, the network 100 is implemented using a star topology, bus topology, a ring topology (for example, a braided-ring topology), and/or a mesh topology. In other implementations, other topologies are used. The embodiment shown in FIG. 1 is described here as being implemented using a TDMA protocol to control access to the communication media 104 by the nodes 102 (though it is to be understood that, in other embodiments, other protocols are used).

Figure 2:
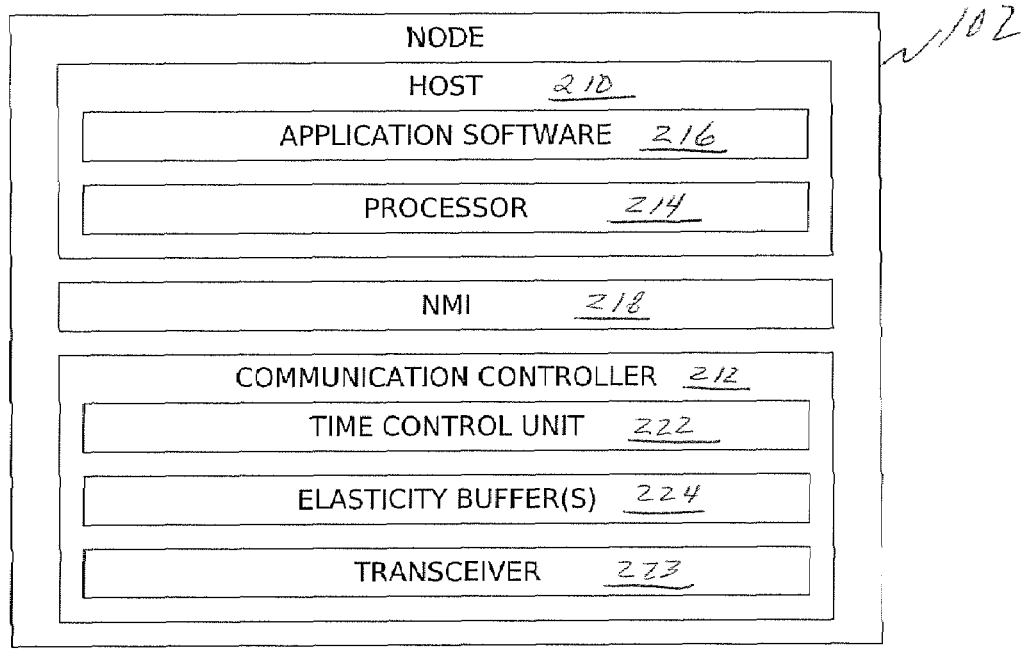
FIG. 2 is a block diagram of an exemplary node suitable for implementing each node of the network shown in FIG. 1.

FIG. 2 is a block diagram of an exemplary node 102 suitable for implementing each node of the network 100 shown in FIG. 1. The node 102 implements a suitable communication protocol (for example, a TDMA protocol). Each node 102 includes a host 210 and an interface 211 for communicatively coupling the node 102 to the communication medium 104. In the particular embodiment shown in FIG. 2, the interface 211 comprises a communication controller 212. The host 210 is implemented using a programmable processor 214 that executes application software 216 that provides the data that is communicated over the network 100 (shown in FIG. 1). For example, in one implementation, the host 210 is a computer executing a safety-critical control application. The host 210 communicates with the other nodes 102 in the communication network 100 using the communication controller 212. An appropriate network memory interface (NMI) 218 serves as an interface between the host 210 and the communication controller 212.

The communication controller 212 implements the functionality of the particular communication protocol supported by the node 102 and includes physical layer functionality to communicate over the particular type of communication media 104 used in the network 100. The communication protocol provides, among other things, a global time base to the application software 216 executing on the host 210. In one implementation of such an embodiment, the communication controller 212 is implemented using a programmable processor (for example, a microprocessor) that is programmed with instructions to carry out at least a portion of the functionality described here as being performed by the communication controller 212. In such an implementation, the instructions are stored on an appropriate storage medium from which they are read for execution by the programmable processor. In such an implementation, the communication controller 212 includes or is coupled to a memory (for example, a random access memory, or processor registers or scratchpad memory) in which at least a portion of the instructions (and/or any related data structures) are stored during execution. In other embodiments, at least a portion of the functionality of communication controller 212 is implemented in other ways. For example, in one such alternative embodiment, at least a portion of such functionality is implemented in software executing by the host 210 (for example, as a part of a networking protocol stack). In another alternative embodiment, the functionality of the communication controller 212 is combined with the host 210 in a single device (for example, a single "system on a chip" integrated chip).

Figure 3:
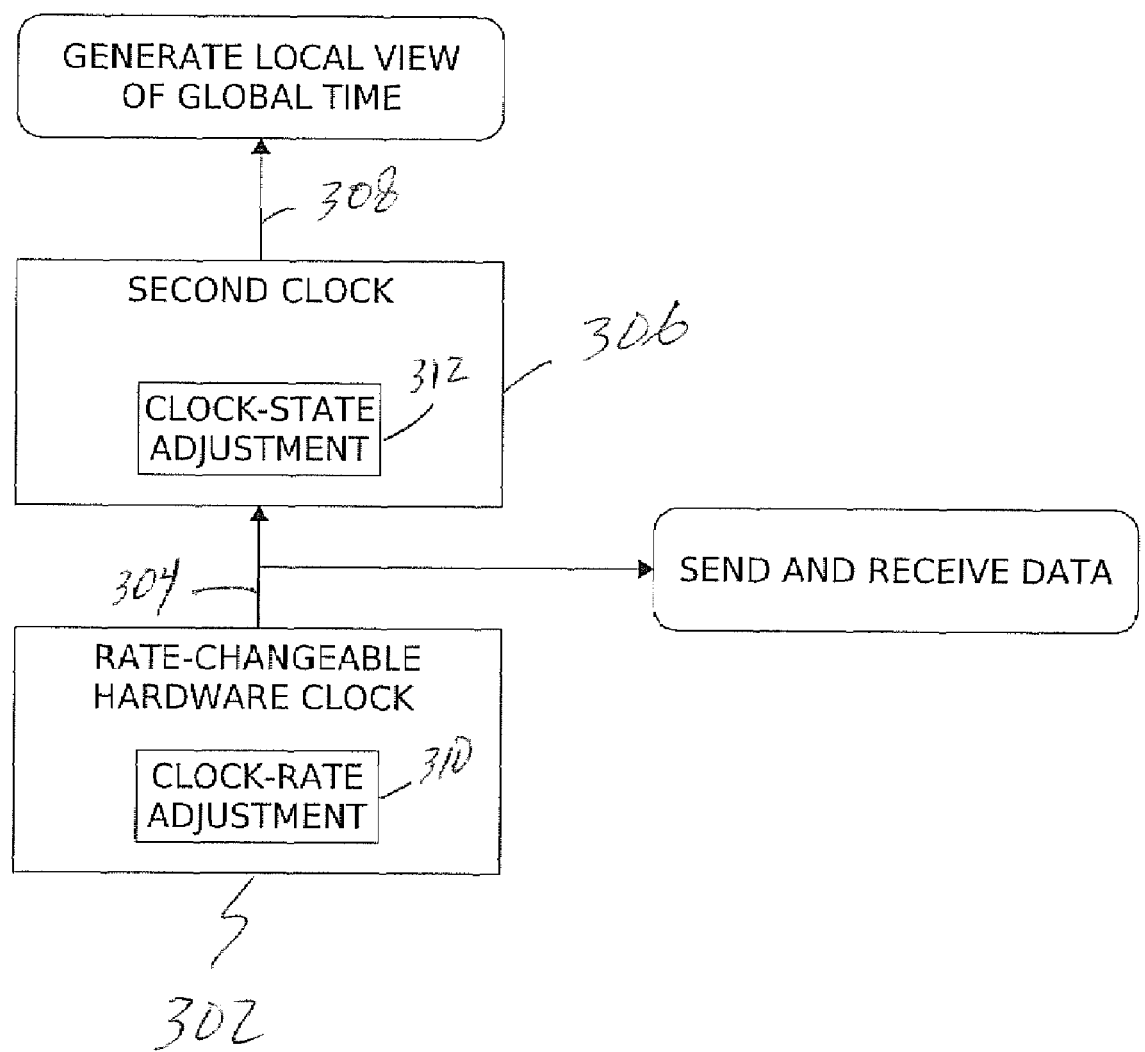
FIG. 3 is a logical block diagram illustrating one embodiment of a clock scheme suitable for use in the node of FIG. 2.

The communication controller 212, in the embodiment shown in FIG. 2, comprises a transceiver 223 that transmits and receives data on the particular communication medium to which the communication controller 212 is communicatively coupled. The communications controller 212 further comprises a timer control unit 222 that is used to generate a local view of the global time for the node 102. Also, the timer control unit 222 outputs the clock signal that is used by the transceiver 223. FIG. 3 logically illustrates the clock scheme used in the node 102 of FIG. 2. A rate-changeable hardware clock 302 is used to output a first clock signal 304 (also referred to here as the "local" clock signal or the "hardware" clock signal). The first clock signal 304 is used by the transceiver 223 as the line encoding/decoding clock to send and receive data from the node 102. A second clock 306 is used to generate a second clock signal 308 that is used to generate a local view of a global time base (for example, to determine when transmissions in the network should start). The rate-changeable hardware clock 302 provides a mechanism 310 to allow the clock rate of the first clock signal to be adjusted while the second clock 306 includes a mechanism 312 to permit the clock state of the second clock signal to be adjusted. In other words, in such a scheme, clock-rate adjustments are made to the rate-adjustable hardware clock 302 while clock-state adjustments are made to the second clock 306.

Figure 4:
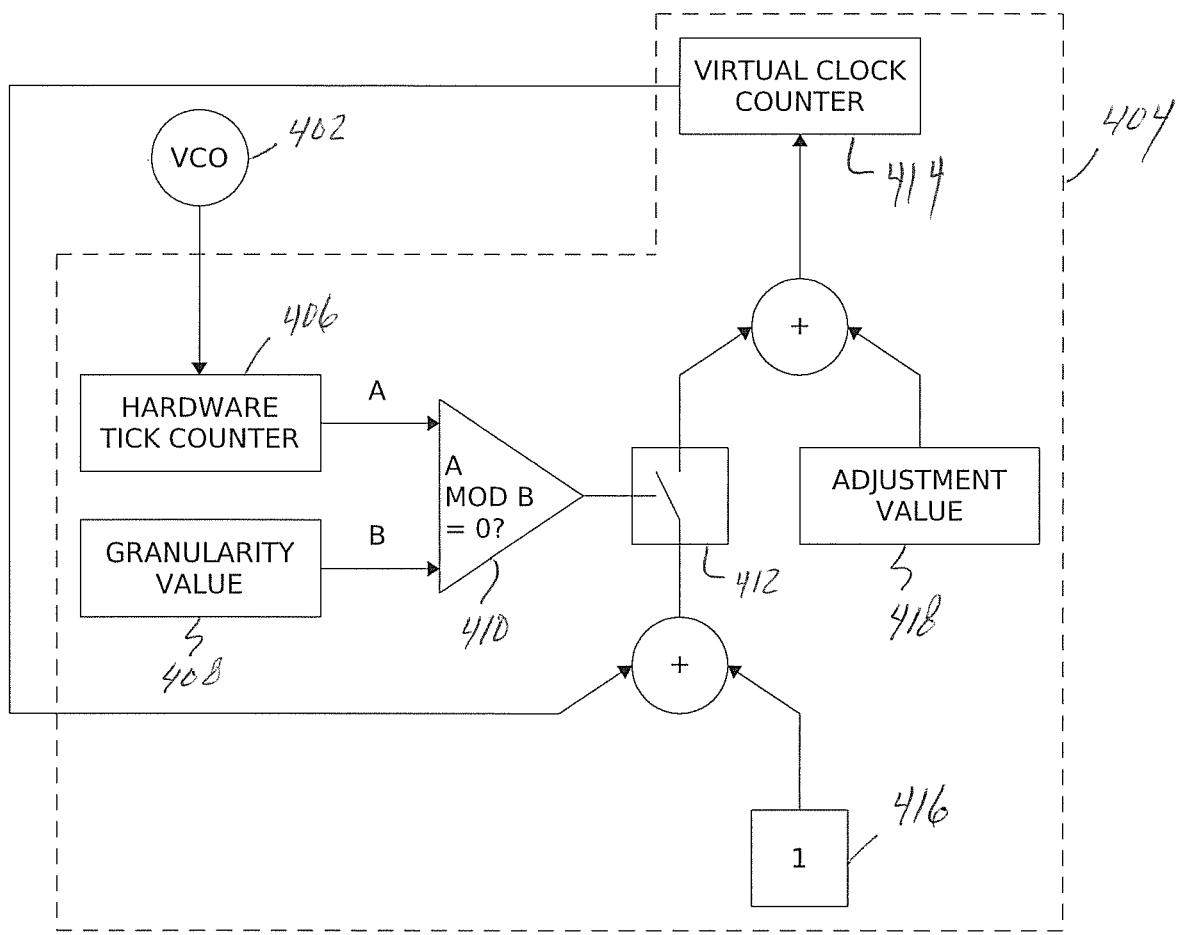
FIG. 4 is a block diagram of one implementation of the clock scheme shown in FIG. 3.

One exemplary embodiment of the clock scheme of FIG. 3 is shown in FIG. 4. In the embodiment shown in FIG. 4, the rate-changeable hardware clock 302 is implemented using a voltage-controlled oscillator (VCO) 402 (for example, a voltage-controlled quartz oscillator) that outputs a series of ticks (also referred to here as "hardware ticks") at a configurable rate. In such an embodiment, the clock-rate adjustment mechanism 310 is the ability to change the frequency at which the VCO 402 oscillates (that is, outputs hardware ticks).

In other embodiments, the rate-changeable hardware clock 302 is implemented in other ways. In one exemplary alternative implementation, a rate-changeable hardware clock comprises a fixed clock or oscillator and an intermediate counter. In such an alternative implementation, the rate-changeable hardware clock comprises an intermediate counter that is incremented once for each tick output by the fixed clock. If the value stored in the intermediate counter modulo a granularity value is equal to zero, a hardware tick is output by the rate-changeable hardware clock. That is, in such an implementation, hardware ticks are output by the rate-changeable hardware clock in accordance with a predetermined ratio 1/N, where the granularity value is equal to N and the rate-changeable hardware clock outputs a hardware tick once for each N ticks of the fixed clock. In order to speed-up such a rate-changeable hardware clock, the granularity value is decreased (for example, to N−1 ticks). In order to slow down such a rate-changeable hardware clock, the granularity value is increased (for example, to N+1 ticks). That is, in such an implementation, the clock-rate adjustment mechanism 310 is the ability to change the granularity value.

In the embodiment shown in FIG. 4, the second clock 306 is implemented using a virtual clock 404 that is able to change (that is, adjust or correct) the state of the hardware clock 302 (that is, the VCO 402) for the purposes of generating for the node 102 a local view of the global time. The logical functionality that makes up the virtual clock 404 is illustrated in FIG. 4. In one implementation of such an embodiment, the virtual clock 404 is implemented using discrete logic devices and/or programmable devices (such as programmable processor, field-programmable gate arrays, and the like).

The virtual clock 404 comprises a hardware tick counter 406 that is incremented once for each hardware tick that is output by the rate-changeable hardware clock 302. If the value stored in the hardware tick counter 406 modulo a granularity value 408 is equal to zero (determined by a logical block 410), a "virtual tick" occurs and a logical switch 412 "closes." When a virtual tick occurs, a virtual tick counter 414 is incremented by one (maintained in a logical block 416) plus an adjustment value 418. The adjustment value 418, in such an embodiment, comprises the clock-state adjustment mechanism 312 noted above in connection with FIG. 3.

The granularity of the local clock (that is, rate-changeable hardware clock 302) is one hardware tick and the granularity of the local view of the global time is one virtual tick. In the particular embodiment shown in FIGS. 1-4, in order for the nodes 102 in the network 100 to have a synchronized view of the global time, all such nodes 102 must have their node-local view of the global time synchronized to within a precision of one virtual tick. The clock scheme used in the node 102 permits both simultaneous clock-state synchronization and clock-rate synchronization. The clock-state of each node 102 is synchronized, in such an embodiment, by adjusting an adjustment value 418 using time-difference measurement values (that is, based on information that is indicative of the difference between an expected time to receive a message and the actual time at which that message was actually received). One exemplary clock-state synchronization algorithm that uses time-difference measurement values and that is suitable for use in time-triggered architectures is the Fault-Tolerant Average (FTA) algorithm described in H. Kopetz, Real-Time Systems: Design Principles for Distributed Embedded Applications, Kluwer Academic Publishers, 1997. In other embodiments and implementations, other clock-state synchronization algorithms are used.

Figure 5:
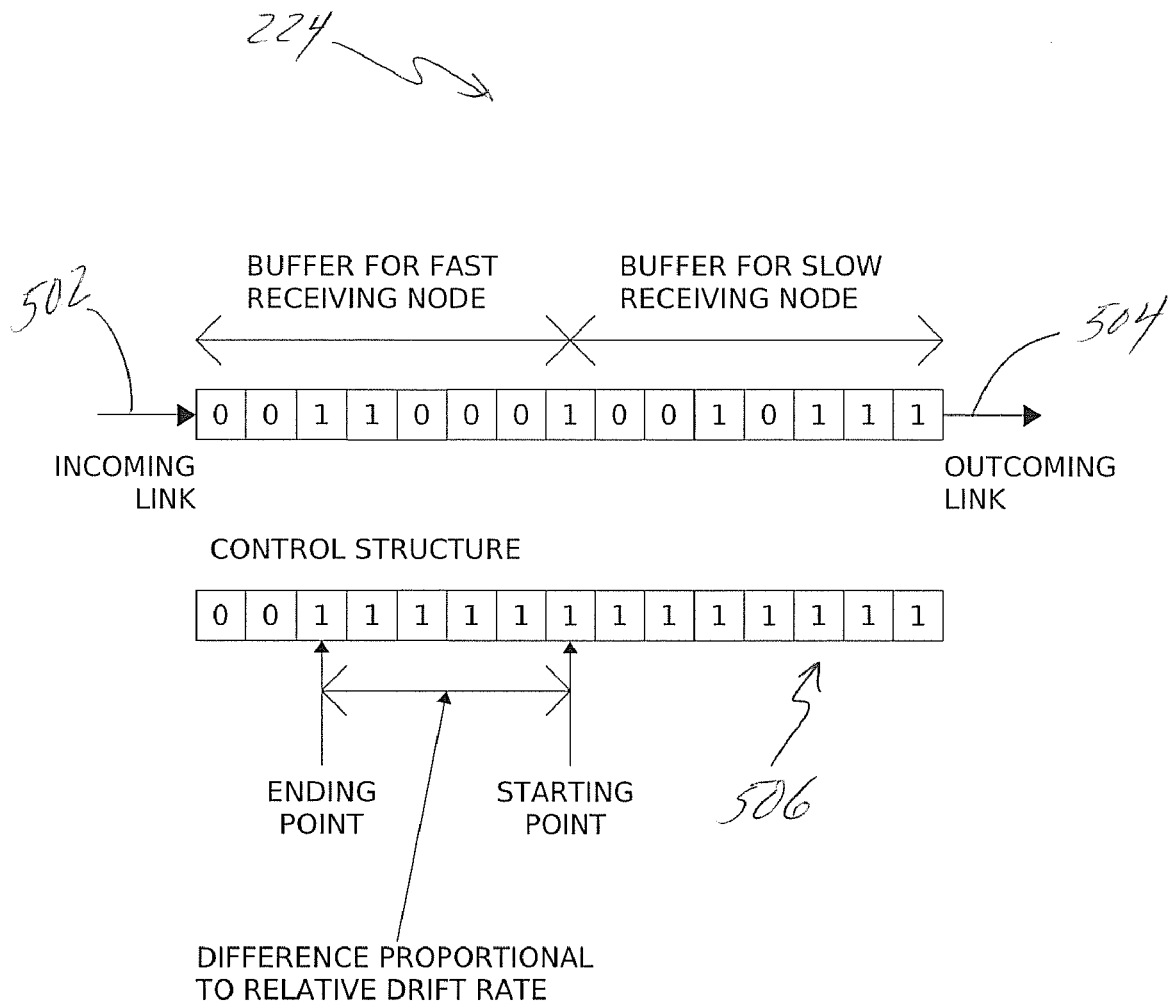
FIG. 5 illustrates the logical operation of one embodiment of an elasticity buffer.

The clock-rate of each node 102 is synchronized, in such an embodiment, by adjusting the rate at which the rate-changeable hardware clock 302 outputs hardware ticks. For example, where the rate-changeable hardware clock 302 is implemented using a VCO 402 (as shown in FIG. 4), the frequency of the VCO is adjusted. Or, in the alternative implementation described above where a fixed clock or oscillator is used, an adjustment is made to the granularity value used to perform the modulo operation on the intermediate counter in order to determine when each hardware tick occurs. In other embodiments, a combination of the two approaches may be used. The amount of such adjustment is determined using relative clock-drift measurements (also referred to here as "relative clock-rate measurements"). In one implementation of such an embodiment, the clock rate of a given node is not changed during the sending of a message. In one implementation of such an embodiment, the communication controller 212 makes such relative clock-rate measurements using one or more elasticity buffers 224 that are included in the communication controller 212 (shown in FIG. 2). FIG. 5 illustrates the logical operation of one such elasticity buffer 224. In the example shown in FIG. 5, the elasticity buffer 224 is the same size as one message or frame communicated in the network 100. When a node 102 (also referred to here as the "receiving" node 102) is forwarding (or relaying) data it receives from an incoming link 502 by transmitting the received data on an outgoing link 504, an elasticity buffer 224 is used to compensate for the differences of the data encoding/decoding clock of the node 102 (for example, clock signal 304 of FIG. 3) that transmitted the data (also referred to here as the "sending" node 102) on the incoming link 502 and the data encoding/decoding clock of the receiving node 102 (for example, clock signal 304 of FIG. 3). The elasticity buffer is designed to prevent both overrun (the input bits come in so much faster than the receiver's clock that the elasticity buffer overflows) and underrun (the input bits come in so much slower than the receiver's clock that the elasticity buffer drains dry) in network architectures where nodes need to forward data while receiving, such as switch and hub nodes in star networks, mesh nodes, and ring nodes When the receiving node 102 starts receiving bits from the incoming link 502 for a particular message or frame (also referred to here as the "current" message), the received bits are shifted into the elasticity buffer 224 (using the local clock of the receiving node 102) until the elasticity buffer 224 is one-half full. The bit cell located at the midpoint of the elasticity buffer 224 is the "starting point" of the current message. At the starting point bits are started to be output and removed from the buffer using the receiving nodes clock. Received bits are inserted on one side (incoming link) and removed from the other side (outgoing link) for sending implementing a first in first out (FIFO) buffer. With FIFO designs using array structures, an empty/full status indicates which bits are received bits ("full") and which bits are "empty" (meaning no data bits received). A control structure 506, in the example shown in FIG. 5, is used to keep track of which bits contain a received bit ("full") and which bit positions are "empty" (or "idle"). The control structure 506 comprises a buffer that contains a corresponding bit cell for each bit cell in the elasticity buffer 224. When a bit is stored in a bit cell in the elasticity buffer 224, a value of "1" (full) is inserted into the corresponding bit cell of the control structure 506 at the left most of the "empty" ("0") position. When an actual data bit is stored in a bit cell in the elasticity buffer 224, a value of "1" is inserted into the corresponding bit cell of the control structure 506. Once the elasticity buffer 224 is one-half full, the receiving node 102 starts transmitting on the outgoing link 504 the bits that are shifted out of the elasticity buffer 224. At the same time, bits received on the incoming link 502 are shifted into the elasticity buffer 224. Logical empty bits are inserted into or deleted from the control structure elasticity buffer 224 where appropriate.

The particular bit cell in the elasticity buffer 224 in which the last bit of the current message is actually stored at the time the last bit cell is received is referred to here as the "ending point" of the current message. If the bits are received on the incoming link 502 at the same rate that the bits in the elasticity buffer 224 are shifted (that is, the rate at which the sending node 102 is transmitting on the incoming link 502 is the same as the rate at which the receiving node 102 is transmitting on the outgoing link 504), the ending point for the current message should be the same as the starting point for the current message (that is, the midpoint of the elasticity buffer 224). If bits are received on the incoming link 502 at a rate less than the rate at which the bits in the elasticity buffer 224 are shifted (that is, the rate at which the sending node 102 is transmitting on the incoming link 502 is less than the rate at which the receiving node 102 is transmitting on the outgoing link 504), the ending point for the current message should occur to the left of the starting point in the example shown in FIG. 5. If bits are received on the incoming link 502 at a rate greater than the rate at which the bits in the elasticity buffer 224 are shifted (that is, the rate at which the sending node 102 is transmitting on the incoming link 502 is greater than the rate at which the receiving node 102 is transmitting on the outgoing link 504), the ending point for the current message should occur to the right of the starting point in the example shown in FIG. 5. The difference between the ending point and the starting point for the current message (as measured in bit cells) is proportional to the magnitude of the relative clock drift between the sending node 102 and the receiving node 102. The relative clock drift between the sending node 102 and the receiving node 102 is determined by multiplying the frequency at which bits are being sampled on the incoming link 502 by the number of bits cells by which the ending point differs from the starting point. In such an implementation, the granularity of the relative clock drift calculation is the frequency at which bits are being transmitted on the outgoing link 504.

In order to obtain a more accurate determination of the relative difference between the clock rate of the sending node 102 and the clock rate of the receiving node 102, the difference between the frequency at which bits are received from the incoming link 502 and the frequency at which bits are transmitted on the outgoing link 504 is determined. The granularity of this determination is dependent on the sampling frequency of the elasticity buffer 224 (that is, the frequency at which the elasticity buffer 224 samples the incoming link 502) and is an integer multiple (e.g. one-fourth) of the sampling frequency.

Such relative clock-rate information can be determined "for free" in a receiving node 102 that already includes an elasticity buffer (for example, in a central guardian component in a star-based topology or for each component in a ring or a mesh topology). In other topologies where a full elasticity buffer is not normally needed (for example, because each node in the network does not normally relay messages it receives), similar techniques can be used in order to determine the relative clock-drift between the receiving node 102 and the sending node 102 by, for example, by adding additional receiver functionality that compares the frequency at which the sending node 102 transmits bits on the bus with the node-local view of the global time at the receiving node 102. In other embodiments, relative clock rate information is determined in other ways. For example, in one alternative embodiment, a counter that is incremented at the sampling frequency of the elasticity buffer 224. The counter is "started" at the beginning of each message and is "stopped" at the end of the message. The difference between the expected value of the counter and the actual value of the counter is proportional to the rate difference between sender and receiver.

Figure 6:
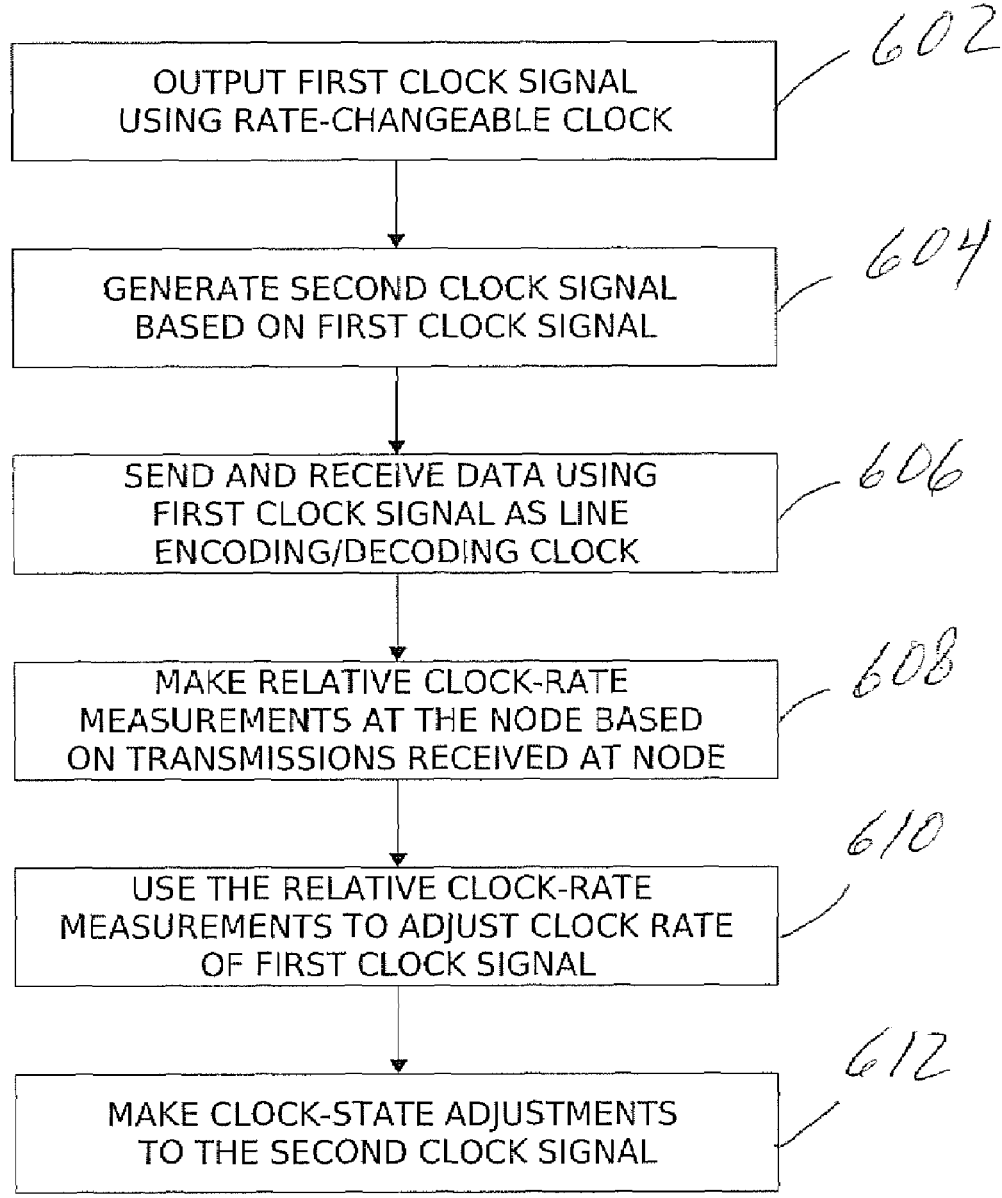
FIG. 6 is a flow diagram of one embodiment of a method of synchronizing a clock by simultaneously synchronizing clock state and clock rate.

FIG. 6 is a flow diagram of one embodiment of a method 600 of synchronizing a clock. The particular embodiment of method 600 shown in FIG. 6 is described here as being implemented in and with the network 100 and node 102 of FIGS. 1-4, wherein the foregoing implement a TDMA protocol (though it is to be understood that other embodiments are implemented in other ways).

In the particular embodiment shown in FIG. 6, the rate-changeable hardware clock 302 outputs a first clock signal (block 602). For example, in one embodiment implemented using the clock scheme illustrated in FIG. 4, the first clock signal is the clock signal output by VCO 402. In the alternative implementation described above where a fixed clock or oscillator is used, the first clock signal is the results of the modulo operation that is performed to determine when each hardware tick occurs. The first clock signal output by the rate-changeable hardware clock 302 is used to generate a second clock signal (block 604). In the embodiment illustrated in FIG. 4, the second clock signal comprises the output of the virtual clock 404, which is generated from the output of the VCO 402.

In method 630, data is sent and received using the first clock signal (that is, the local clock) output by the rate-changeable hardware clock 302 as the line encoding/decoding clock (block 606). That is, the transceiver 223 uses as its clock the local clock signal output by the rate-changeable hardware clock 302. While the transceiver 223 is using the local clock as its clock, the node 102 makes appropriate relative clock-rate measurements for each incoming link 402 on which the node 102 receives data during the relevant period (block 608). The relative clock-rate measurements, in such an embodiment, are made as noted above in connection with FIG. 5. The relative clock-rate measurements are used to adjust the clock rate of the local clock (block 610). In one implementation, a fault-tolerant averaging function is used for calculating the clock-rate adjustment (for example, a fault-tolerant median function similar to the fault-tolerant median clock-state synchronization function described in J. Lundelius and N. Lynch, A New Fault-Tolerant Algorithm For Clock Synchronization, In Proceedings of the 3rd annual ACM symposium on Principles of Distributed Computing, pages 75-88. ACM, 1984). In one implementation of such an embodiment where the rate-changeable hardware clock 302 is implemented using a VCO 402, such an adjustment of the clock rate of the rate-adjustable clock 302 is made by adjusting the frequency of the VCO 402. In the alternative implementation described above where a fixed clock or oscillator is used, the clock-rate adjustment comprises an adjustment to the granularity value used to perform the modulo operation on the intermediate counter in order to determine when each hardware tick occurs.

In such an embodiment, clock-state adjustments are also made to the second clock signal (block 612). For example, in one implementation, the clock-state adjustment processing comprises making time-difference measurements and using, for example, the FTA algorithm noted above. The clock-state adjustment, in such an implementation, comprises an adjustment to the adjustment value 420 of the receiving node 102. The making of clock-rate adjustments to the first clock signal does not preclude also simultaneously making clock-state adjustments to the second clock signal. The clock-rate adjustments made to the first clock do not interfere with the clock-state adjustments made to the second clock signal (since a different mechanism is used to make each type of adjustment) and no blockout period (in which clock-state adjustments are not made) is needed when a clock-rate is measured.

In one implementation of such a method, the clock-rate adjustments and/or the clock-state adjustments are made after each time slot in a TDMA round. In another implementation, the clock-rate adjustments and/or the clock-state adjustments are made after each TDMA round. In other embodiments, the adjustments are made at other times (for example, after multiple TDMA rounds). In one embodiment, clock-rate adjustments and/or clock-state adjustments are made prior to a node's operation in synchronous mode.

In a network 100 that has a bus topology, a node 102 is able to obtain relative clock-rate measurements with respect to each other node 102 that transmits on the bus during a given TDMA round. In a network 100 that has a topology in which each node 102 is not directly coupled to each of the other nodes 102 in the network, for example, in a ring, star, or mesh topology, a node 102 is able to obtain relative clock-rate measurements with respect to each of the other nodes 102 that are directly coupled to that node 102 and that transmits during a given TDMA slot. One example of such a network topology where not all nodes are directly connected to each other is a "braided ring" topology of the type described in U.S. patent application Ser. No. 10/993,936, titled "SYNCHRONOUS MODE BROTHER'S KEEPER BUS GUARDIAN FOR A TDMA BASED NETWORK," filed on Nov. 19, 2004, which is hereby incorporated by reference in its entirety. However, in such a network, for each node 102, there will be other nodes 102 in the network that that node 102 will not receive messages from and will not be able to make relative clock-rate measurements with respect thereto. Nodes can converge towards a common rate by indirectly changing their rates with respect to each other as long as there are no circular dependencies for clock rate corrections due to the topology or the correction algorithm defines a break of potential circular corrections. In order to have the nodes 102 in such network 100 converge to the same clock rate in a reasonable amount of time, the embodiment of method 600 shown in FIG. 6 can be employed to make clock-rate adjustments after each time slot of each TDMA round. In this way, the clocks of each node in the network are able to converge to the same clock rate more quickly than if, for example, such adjustments were made after each slots. In an alternative embodiment, relative clock-rate measurements made by each node are communicated to the other nodes of the network for their use in calculating clock-rate adjustments and/or for higher-order processing. For such approaches circular dependencies may be implicitly resolved by the clock rate correction higher-order algorithm.

In a network having a topology where nodes resend (that is, forward or relay) the received frames (such as in mesh or braided ring topologies), the adjustment of the clock rate should be done so as to not affect the physical layer. For example, in such an example, the adjustment of the clock rate should not change the bit pattern over the message send time. This is the case because if the same message is resent by several nodes, and each node skips part of a bit cell due to clock-rate adjustment, a whole bit cell might get dropped in the course of sending, which typically should be avoided.

The systems, devices, methods, and techniques described here may be implemented in other ways in other embodiments. For example, in one other embodiment, each receiving node only makes relative clock-rate measurements with respective to a selective group of sending nodes (for example, nodes that have more accurate clocks).

Embodiments of the systems, devices, methods, and techniques described here may have one or more of the following advantages. First, synchronizing the clock rate using such relative clock-rate measurements can improve the performance in adjusting clock skew as the clock rate is determined after each message reception instead of having to measure two subsequent time difference values of the same sending unit. In a network topology with direct communication links (such as a braided ring), the clock-rate correction can even be performed after each message reception (that, after each time slot as noted above). Also, by synchronizing the clock rate using such relative clock-rate measurements, the clock-state adjustments that need to be made become smaller after the correction of the clock rate. This is in comparison to conventional approaches that simulate clock-rate correction using clock-state correction, where such clock-state corrections tend to be relatively larger. With such conventional approaches, the clock-state correction can become relatively large at each correction since it combines a portion for clock-state correction and a portion for clock-rate correction into one value. Also, it is typically desirable to avoiding interaction or interference between clock-rate correction and clock-state correction since, in conventional approaches, the need for clock-state correction tends to increase where clock-rate correction is simulated using conventional approaches. Furthermore, with the embodiments described here, the corrected clocks (both state and rate) can also be used for application layers as a continuous time base since there will tend to be no significant jumps in the time base.

Moreover, in networks with sufficient direct links between nodes, clock-rate correction can be performed before clock-state correction starts, which can decrease the achievable precision, since the clock-rate can be corrected even before the network starts sending synchronously according to a TDMA access pattern. For example, this type of correction can be used in systems that implement a time-triggered protocol and can be performed before synchronous communication starts so that such synchronous communications are performed with a smaller precision value.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method performed at a node, the method comprising:
outputting, from a rate-changeable clock included at the node, a first clock signal having a clock rate;
generating a second clock signal from the first clock signal for use in determining when transmissions in a network are to start;
sending and receiving data from the node using the first clock signal as a line encoding/decoding clock;
making relative clock-rate measurements at the node based on transmissions received at the node;
using the relative clock-rate measurements to adjust the clock rate of the rate-changeable clock;
making clock-state adjustments to the second clock signal.

2. The method of claim 1, wherein the clock-state adjustments to the second clock signal are made without using a blockout period in which no clock-state adjustments are made.

3. The method of claim 1, wherein relative clock-rate measurements are made for each time slot in a time division multiple access round.

4. The method of claim 3, wherein an adjustment to the clock rate of the first clock signal is made for each time slot in the time division multiple access round.

5. The method of claim 1, wherein each respective relative drift-rate measurement is made using an elasticity buffer.

6. The method of claim 1, wherein making an adjustment to the clock rate of the first clock signal comprises at least one of: adjusting an output of a voltage controlled oscillator and adjusting a virtual clock granularity value.

7. The method of claim 1, wherein at least a portion of the adjustments to the clock rate of the first clock signal are applied to the first clock signal prior to operating the node in a synchronous mode.

8. A node comprising:
a rate-changeable clock that outputs a first clock signal at a clock rate; and a transceiver to send and receive data;
wherein the transceiver uses the first clock signal as its line encoding/decoding clock for sending and receiving data;
wherein the node generates a second clock signal from the first clock signal for use in determining when transmissions in a network are to start;
wherein the node makes relative clock-rate measurements and uses the relative clock-rate measurements to adjust the clock rate of the rate-changeable clock;
wherein the node makes clock-state adjustments to the second clock signal.

9. The node of claim 8, wherein the node implements a time-division multiple access protocol.

10. The node of claim 9, further comprising an elasticity buffer, wherein the node makes the relative clock-rate measurements using the elasticity buffer.

11. The node of claim 10, wherein the node makes the relative clock-rate measurements using the elasticity buffer by comparing a staffing position in the elasticity buffer for a message and a ending position in the elasticity buffer for the message.

12. The node of claim 9, wherein the node makes the relative clock-rate measurements during message sending by determining the difference between a frequency at which bits are received and a frequency at which bits are transmitted.

13. The node of claim 9, wherein the rate-changeable clock comprises a fixed-rate clock and an intermediate counter that is incremented once for each tick output by the fixed rate clock, wherein the node makes each adjustment to the clock rate of the rate-changeable clock by adjusting a granularity value used to determine when to output a hardware tick.

14. The node of claim 8, wherein the rate-changeable clock comprises a voltage-controlled oscillator, wherein the node makes each adjustment to the clock rate of the rate-changeable clock by adjusting the frequency of the voltage-controlled oscillator.

15. The node of claim 8, wherein the clock-rate measurements are communicated to another node in the network.

16. The node of claim 8, wherein the node is included in a network having at least one of a bus topology, a ring topology, and a mesh topology.

17. The node of claim 8, wherein the node makes the clock-state adjustments to the second clock signal without using a blockout period in which no clock-state adjustments are made.

18. A node comprising:
a rate-changeable clock that outputs a first clock signal at a clock rate;
a transceiver to send and receive data; and
an elasticity buffer;
wherein the transceiver uses the first clock signal as its line encoding/decoding clock for sending and receiving data;
wherein the node makes relative clock-rate measurements using the elasticity buffer and uses the relative clock-rate measurements to adjust the clock rate of the rate-changeable clock.

19. The node of claim 18, wherein the node makes relative clock-rate measurements using the elasticity buffer by comparing a starting position in the elasticity buffer for a message and an ending position in the elasticity buffer for the message.

20. The node of claim 19, wherein the node makes relative clock-rate measurements using the elasticity buffer by incrementing a counter at a sampling frequency of the elasticity buffer, wherein the difference between an expected value of the counter at the end of a message and the actual value of the counter at the end of the message is proportional to the rate difference between a sender and a receiver.

* * * * *